United States Patent
Gonzalez et al.

(10) Patent No.: US 10,330,412 B2
(45) Date of Patent: Jun. 25, 2019

(54) DURABLE ASSET MANAGEMENT TAG

(71) Applicant: Impact Resources, Inc., Bethesda, MD (US)

(72) Inventors: Cesar Gonzalez, San Marcos, CA (US); Jason Hackerson, Bristow, VA (US)

(73) Assignee: Impact Resources, Inc., Bethesda, MD (US)

( * ) Notice: Subject to any disclaimer, the term of this patent is extended or adjusted under 35 U.S.C. 154(b) by 0 days.

(21) Appl. No.: 15/422,371

(22) Filed: Feb. 1, 2017

(65) Prior Publication Data
US 2018/0216906 A1 Aug. 2, 2018

(51) Int. Cl.
| | | |
|---|---|---|
| *G08B 13/14* | (2006.01) | |
| *F41A 17/06* | (2006.01) | |
| *G06Q 10/08* | (2012.01) | |
| *G08B 21/02* | (2006.01) | |
| *G08B 13/24* | (2006.01) | |
| *F41C 33/02* | (2006.01) | |

(52) U.S. Cl.
CPC .......... *F41A 17/063* (2013.01); *G06Q 10/087* (2013.01); *G08B 13/2468* (2013.01); *G08B 21/0275* (2013.01); *F41C 33/029* (2013.01); *G08B 13/1427* (2013.01)

(58) Field of Classification Search
CPC . F41A 17/063; G06Q 10/087; G08B 21/0275; G08B 13/1427; F41C 33/029
USPC ....................................................... 340/572.1
See application file for complete search history.

(56) References Cited

U.S. PATENT DOCUMENTS

| | | | |
|---|---|---|---|
| 4,296,929 A | 10/1981 | Meyer et al. | |
| 5,785,592 A | 7/1998 | Jacobsen | |
| 6,031,454 A | 2/2000 | Lovejoy et al. | |
| 6,601,764 B1 | 8/2003 | Goodwin, III | |
| 7,004,848 B2 | 2/2006 | Konow | |
| 7,109,859 B2 | 9/2006 | Peeters | |

(Continued)

OTHER PUBLICATIONS

Bolt on RFID Tag—William Frick & Company—https://www.fricknet.com/Products/SmartMark_RFID/Compact_Bolt_on_RFID_Tag.html (retrieved Jan. 13, 2017).

(Continued)

*Primary Examiner* — Tanmay K Shah
(74) *Attorney, Agent, or Firm* — Dickinson Wright PLLC

(57) ABSTRACT

A tracking system for durable assets such as personal weapons is provided. The tracking system includes a durable asset tag including an RFID transponder physically mounted within an externally exposed cavity of the durable asset, and an identification card with a machine-readable third unique identifier associated with a person. Different embodiments are disclosed for the durable asset tag, with one embodiment including a helical antenna connected to the RFID transponder for facilitating communication with an RFID reader. The system also includes first and second databases, each storing information associated with the durable asset, and an AIM interface terminal for receiving the first unique identifier from the durable asset tag and the third unique identifier from the identification card, and which communicates with the databases for checking-in or checking-out the durable asset to the person having the identification card. The durable asset tag may be original to the durable asset or retrofitted thereto after manufacture. Methods are also provided for associating unique identifiers with a durable asset, tagging the durable asset, checking-in and checking-out the durable asset.

10 Claims, 9 Drawing Sheets

(56) References Cited

U.S. PATENT DOCUMENTS

| | | | |
|---|---|---|---|
| 7,148,803 | B2 | 12/2006 | Bandy et al. |
| 7,461,972 | B2 | 12/2008 | Cohen |
| 7,518,504 | B2 | 4/2009 | Peeters |
| 7,782,208 | B2 | 8/2010 | Kennedy |
| 7,969,307 | B2 | 6/2011 | Peeters |
| 8,683,727 | B2 | 4/2014 | McLean |
| 9,041,538 | B2 | 5/2015 | Peeters |
| 9,470,699 | B2 | 10/2016 | Peeters |
| 9,931,578 | B2 | 4/2018 | Weston |
| 2003/0008722 | A1 | 1/2003 | Konow |
| 2005/0183314 | A1 | 8/2005 | Holznecht et al. |
| 2005/0262751 | A1 | 12/2005 | Leslie |
| 2006/0208857 | A1 | 9/2006 | Wong |
| 2011/0153637 | A1 | 6/2011 | Bailey et al. |
| 2011/0174885 | A1 | 7/2011 | Hansen |
| 2011/0309975 | A1 | 12/2011 | Chu |
| 2014/0260424 | A1 | 9/2014 | Warren |
| 2014/0357373 | A1* | 12/2014 | Barney ............... A63H 30/04 463/37 |
| 2015/0077255 | A1 | 3/2015 | Pallotta |
| 2015/0235120 | A1* | 8/2015 | Warren ............ G06K 19/07762 235/439 |
| 2017/0014714 | A1 | 1/2017 | Barney et al. |

OTHER PUBLICATIONS

General Motors Factory Installs Smart Bolts in Engine Blocks, Cylinder Heads by Claire Swedberg http://www.rfidjournal.com/articles/view?11329 (retrieved Jan. 13, 2017).

GyRFID presents RFID Screw Tag (SCA Series) for asset tracking—https://www.prlog.org/10748266gyrfidpresentsrfidscrewtagscaseriesforassettracking.html (retrieved Jan. 24, 2017).

Rfid Pin Tag Product on Alibaba.com—https://www.alibaba.com/productdetail/rfidpintag_2014510788.html (retrieved Jan. 24, 2017).

Screw & Bolt Tags RFID Inc.—http://rfidinc.com/products/866928mhzuhf/screwbolttags/ (retrieved Jan. 13, 2017).

This Bolt is the Key to GM's High-Tech Assembly Line, Matthew De Paula http://www.popularmechanics.com/cars/a9959/thisboltisthekeytogmshightechassemblyline16324897/ (retrieved Jan. 13, 2017).

UHF 860-928 MHz RFID Bolt Tag _ GAO RFID Inc._—http://gaorfid.com/product/ruggeduhfrfidbolttagforonmetalapplication/ (retrieved Jan. 24, 2017).

R-Bolt RTEC—http://www.rfrid.com/En/Home/ProductDetail/id/39 (retrieved Sep. 14, 2018).

Cheap Price Customized Metal RFID Screw Tag, Techcrepower Technologies Limited—https://techcrepower.en.maden-in-china.com/product/DNUQmpYVugcR/China-Cheap-Price-Customized-Metal-RFID-Screw-Tag.html (retrieved Sep. 14, 2018).

UHF 915 MHz Bolt & Screw RFID Tags, RFID, Inc.—https://www.rfidinc.com/uhf-915-mhz-bolt-screw-rfid-tags/ (retrieved Sep. 14, 2018).

Synotag RFID Bolt for Through-hole Applications, Synometrix Limited—https://www.synometrix.com/rfid-tags/hardware-tags/nut-bolt-tag-816/ (retrieved Sep. 14, 2018).

International Application No. PCT/US18/15477—Invitation to pay additional fees, and where applicable, protest fees—dated Apr. 27, 2018.

* cited by examiner

DURABLE ASSET MANAGEMENT TAG

BACKGROUND OF THE INVENTION

Field of the Invention

The present invention relates generally to a tracking system for durable assets such as personal weapons, and more specifically to a system including a durable asset tag which is provided as a structural component of the durable asset and which includes an RFID transponder capable of wireless communication for uniquely identifying the durable asset.

Description of the Prior Art

Systems for tracking durable assets using RFID transponders are known in the prior art. One such system is disclosed in U.S. Patent Application Publication No. 2005/0262751, in which a passive-type RFID transponder is mounted within a personal weapon and is used to track the issuance of the personal weapon to an individual person. Another such system is disclosed in U.S. Patent Application Publication No. 2006/0208857, which generally describes the RFID transponder being embedded in a durable asset.

SUMMARY OF THE INVENTION

The invention provides for a durable asset tag including an RFID transponder that is provided as a structural component of a durable asset, such as a personal weapon. The durable asset tag of the present invention provides for RFID tracking of the durable asset and can be easily installed in an externally exposed cavity of a durable asset in place of an existing component, without the need for a time-intensive tear-down of the durable asset, and without requiring the durable asset to be otherwise modified in any way. The durable asset tag can be easily swapped out for a different durable asset tag or for a non-RFID replacement component. By placing the RFID transponder within a removable durable asset tag, the RFID transponder may be protected from physical damage and from chemical agents such as cleaning solvents. It also allows for durable asset to be wirelessly identified without altering the military specification, structural integrity, assembly, or maintenance of the durable asset.

The invention provides for a method for a tracking system which includes inserting an RFID transponder within a plug of electrically insulating material, and inserting the plug together with the RFID transponder within a cavity of a metal body of the durable asset tag, and sealing the cavity with the plug disposed therein with a covering, which functions to secure the plug and the RFID transmitter within the body and to prevent the intrusion of contaminants. The invention also provides for a method of associating one or more unique identifiers with a durable asset, including a second unique identifier of an RFID transponder installed within the durable asset, and for storing the association in a database. This allows for a tracking system that can wirelessly identify the durable asset, to receive information about it, and to check-in and check-out the durable asset by recording its association with a third unique identifier of a person to whom the durable asset is checked-in or checked-out.

BRIEF DESCRIPTION OF THE DRAWINGS

Other advantages of the present invention will be readily appreciated, as the same becomes better understood by reference to the following detailed description when considered in connection with the accompanying drawings, wherein.

DETAILED DESCRIPTION OF AN ENABLING EMBODIMENT

Figure 1:
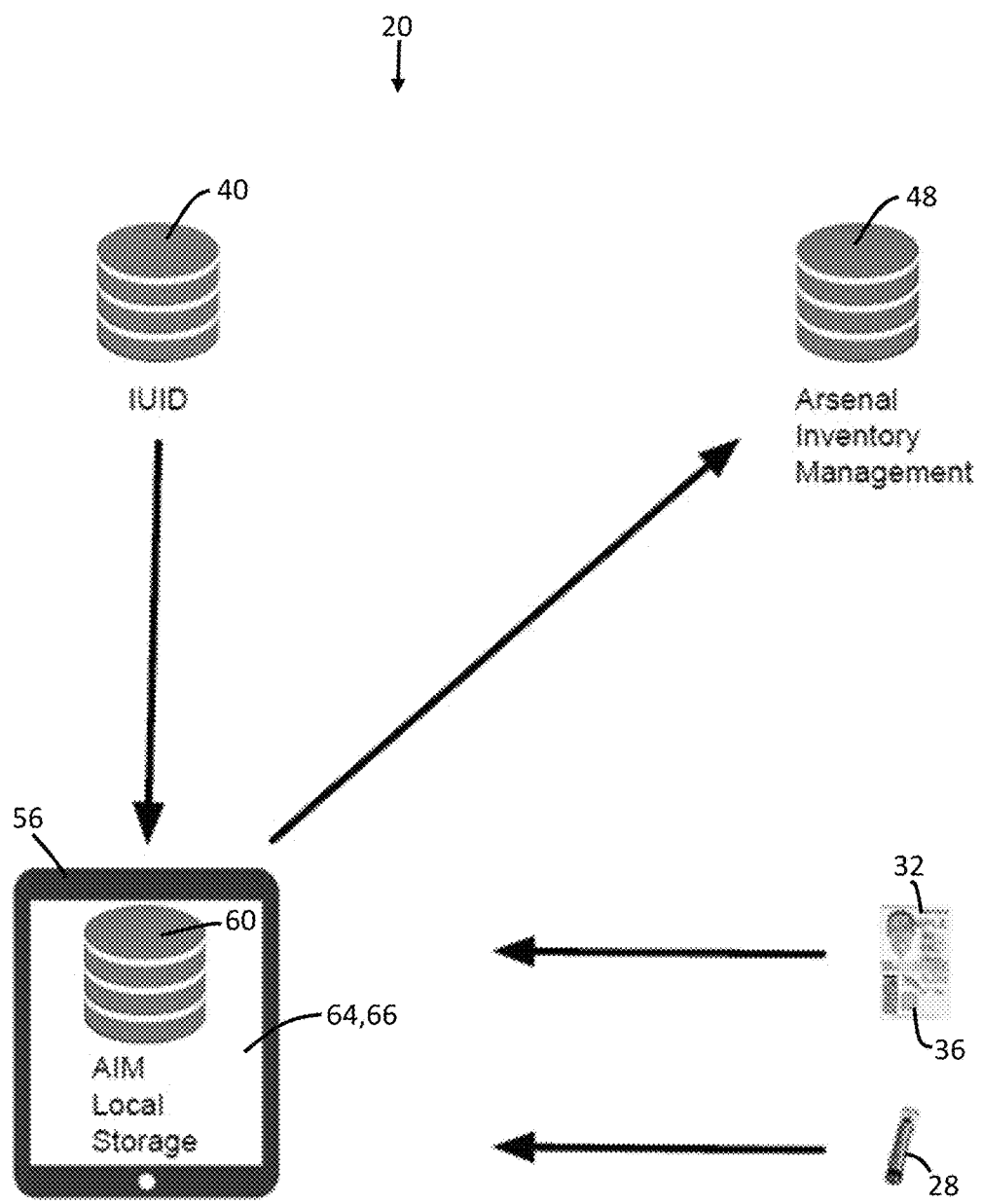
FIGS. 1 and 2 are block diagrams of a tracking system according to an embodiment of the subject invention.

Referring to the drawing figures, wherein like numerals indicate corresponding parts throughout the several views, an embodiment of a tracking system 20 for durable assets such as personal weapons 22 is generally shown in FIGS. 1-9, 10A-10B, 11A-11C, and 12-15. A personal weapon 22 is defined herein as a weapon capable of being carried by an individual person. Examples of personal weapons include but are not limited to rifles, pistols, shotguns, other types of firearms, knives, bayonets, grenades, and so on. Personal weapons may also include non-lethal weapons and defensive devices including but not limited to Tasers, stun guns, pepper spray dispensers, tear gas canisters, handcuffs, nightsticks, and batons. The personal weapon 22 may have a serial number 24 imprinted thereon and unique to that specific personal weapon 22 among all other personal weapons 22 having the same manufacturer and model. The personal weapon 22 may be associated with a first unique identifier 26 in the form of a string of characters which is globally unique and unambiguous for distinguishing the personal weapon 22 from all other like and unlike items. The first unique identifier 26 may be, for example, a U.S. Department of Defense DOD standard Unique Item Identifier (UII).

The tracking system 20 may include an RED transponder 28, which may be a passive RFID device that is externally powered and has a second unique identifier 30 which is machine readable by radio frequency and which may be physically mounted within the personal weapon 22. The second unique identifier 30 may be the same as the first unique identifier 26. Alternatively, the second unique identifier 30 may be different from the first unique identifier 26, and may be a shortened or compressed version thereof. Such an arrangement may be used, for example where the RFID transponder is not capable of storing the entire first unique identifier 30 due to identifier size limitations. The second unique identifier 30 may also be entirely different from the first unique identifier 26 and be associated therewith by reference to a mapping database or by other means. The RPM transponder 28 may be, for example, Hitachi Model No. IM5-PK2525, having dimensions of 2.5 mm×2.5 mm×0.4 mm.

The tracking system 20 may include an identification card 32 associated with an individual person who the personal weapon 22 may be checked out to or checked in from. The identification card 32 may have a machine-readable third unique identifier 34 associated therewith and may be, for example, a U.S. DOD Common Access Card (CAC) with an integrated circuit chip 36 including a first storage medium 38 being computer-readable non-transitory storage and holding the third unique identifier 34.

Figure 2:
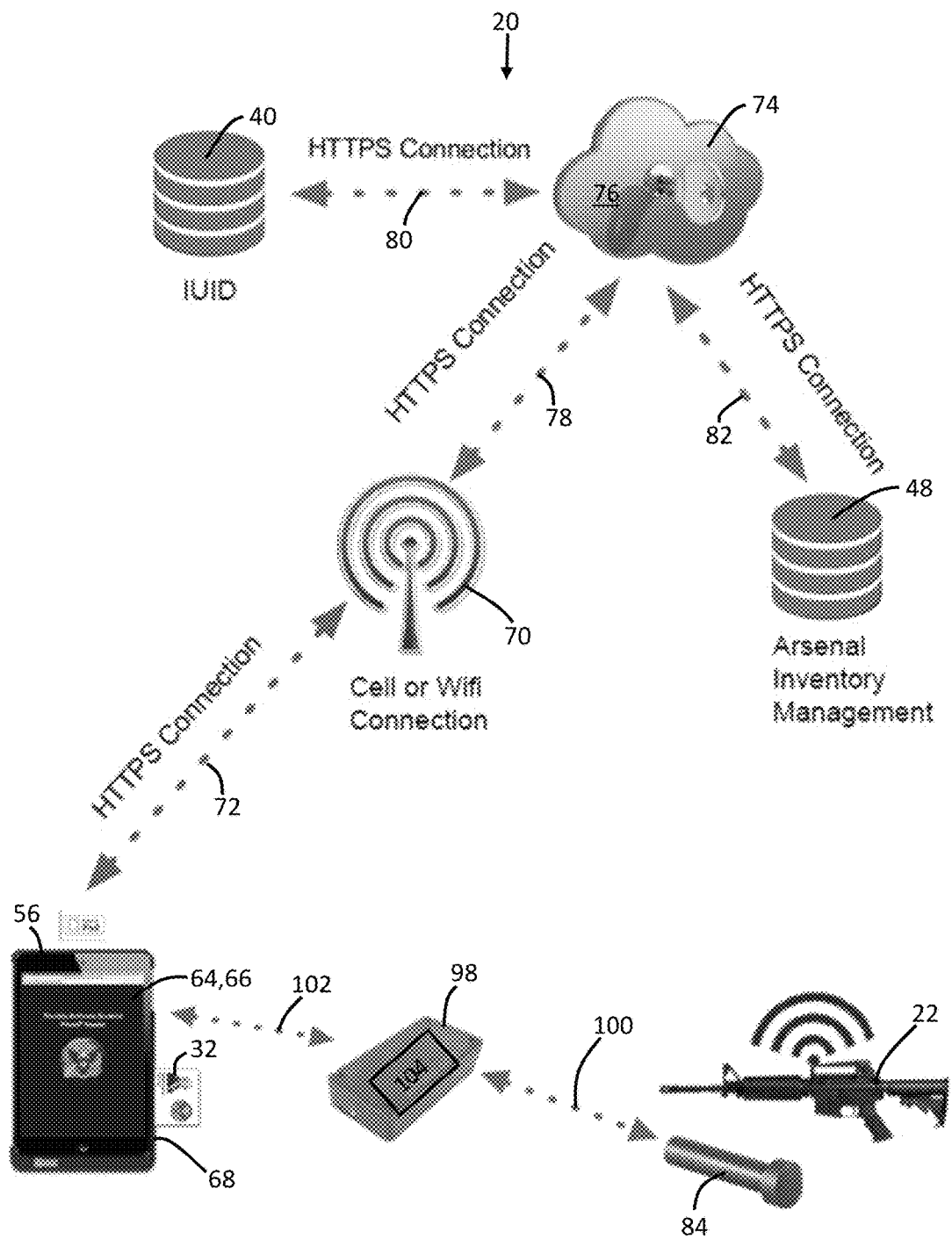
Figure 3:
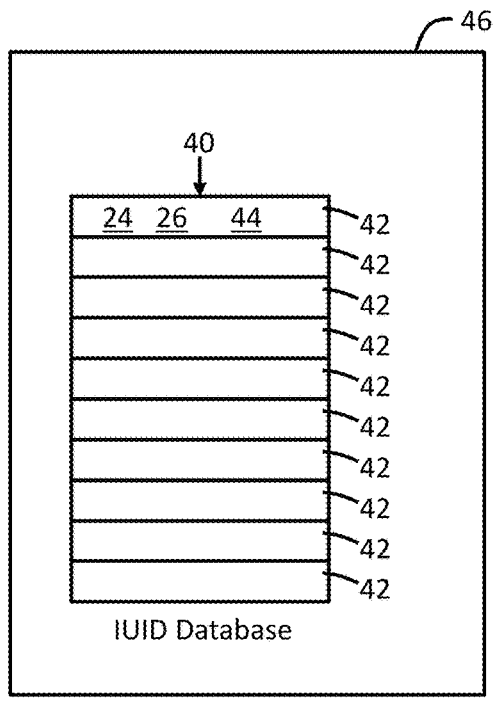
FIG. 3-5 are schematic diagrams of storage media and data structures stored therein according to an embodiment of the subject invention.

As shown in FIGS. 1-3, the tracking system 20 may include a first database 40 storing a plurality of first entries 42, each of which corresponds to a physical item. The first database 40 may be, for example, an Item Unique ID (IUID) Database. As shown in FIG. 3, one of the first entries 42 in the first database 40 may be associated with the personal weapon 22 and may include the first unique identifier 26 and background data 44 about the personal weapon 22, which may include, for example, a serial number 24, a make, a model, a manufacturer name, and/or an acquisition date. The first database 40 may be located on a second storage medium 46 being a computer-readable non-transitory storage medium.

Figure 4:
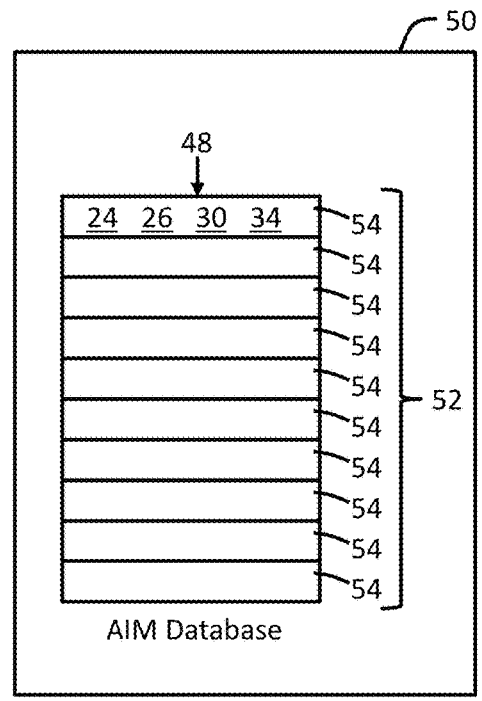

As shown in FIGS. 1-3, the tracking system 20 may include a second database 48 which may be an Arsenal Inventory Management (AIM) database. As shown in FIG. 4, the second database 48 may be located on a third storage medium 50 which may be a computer-readable non-transitory storage medium, with the second database 48 storing a first plurality 52 of second entries 54, with each of the second entries 54 corresponding to a specific individual item and including the first unique identifier 26 and the second unique identifier 30, each associated therewith.

Figure 5:
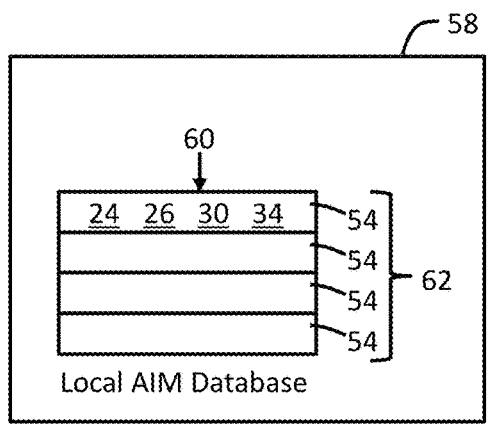
Figure 6:
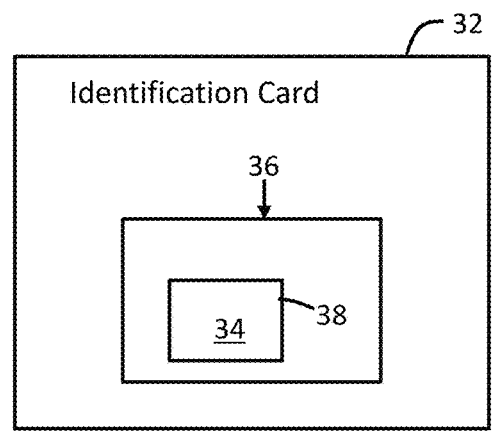
FIG. 6 is a block diagram of an identification card according to an embodiment of the subject invention.
Figure 7:
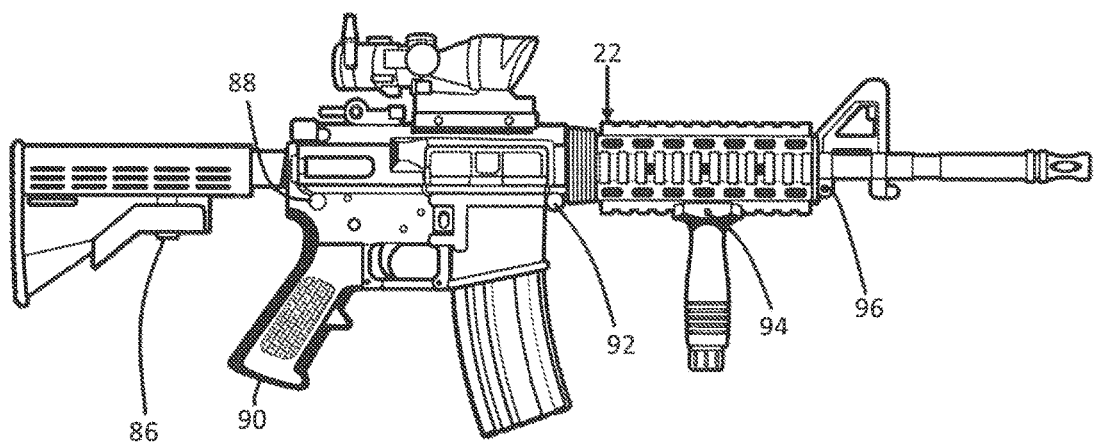
FIG. 7 is diagram of a personal weapon that has been modified with a durable asset tag according to an embodiment of the subject invention.

As shown in FIGS. 1-2, the tracking system 20 may include an AIM interface terminal 56, which can be a portable electronic device such as an iPad, tablet, smart phone, or other device, and which is capable of securely communicating with the second database 48. As shown in FIG. 5, the portable electronic device may include a fourth storage medium 58 being a computer-readable non-transitory storage medium, which may store a third database 60 holding a second plurality 62 of the second entries 54 being a subset of the first plurality 52 of the second entries 54 in the second database 48. The AIM interface terminal 56 includes a display screen 64 for communicating information to a user, and a user input device 66 such as a touch screen. The AIM interface terminal 56 may also include and a smart card interface 68 for reading the third unique identifier 34 from the integrated circuit chip 36 in order to uniquely identify the individual person who the personal weapon 22 is to be checked out to or checked in from. Such smart card interface 68 may include, for example, a TSS-PK series iPad reader from Thursby Software Systems, Inc.

As shown in FIG. 1, the tracking system 20 may include an access point 70 in the form of a wireless router providing a first secure connection 72 for transmitting data between the AIM interface terminal 56 and one of the first database 40 or the second database 48. The first secure connection 72 may be, for example, a connection or a cellular data connection.

As shown in FIG. 1, the tracking system 20 may also include a cloud service 74 including a fifth storage medium 76 being a computer-readable non-transitory storage medium and being distributed among one or more physical devices for temporarily storing copies of the data being sent to or read from the AIM interface terminal 56. The cloud service 74 may be, for example, a hosting enclave approved by the U.S. DoD or another government department or agency. The system may include any combination of a second secure connection 78 for transmitting data between the access point 70 and the cloud service 74, a third secure connection 80 for transmitting data between the cloud service 74 and the first database 40, and a fourth secure connection 82 for transmitting data between the cloud service 74 and the second database 48. Any or all of the secure connections 72, 78, 80, 82 may be secured using the HTTPS standard. Any or all of the secure connections 72, 78, 80, 82 may also be secured in part or in whole using public key encryption.

The tracking system 20 may also include a durable asset tag 84, 84', 84" including the RFID transponder 28. The durable asset tag 84, 84', 84" is preferably an assembly-level component of the personal weapon 22 which preferably remains stationary as the personal weapon 22 is used. Such use includes, for example where the personal weapon 22 is a firearm, firing and cycling between shots. The durable asset tag 84, 84', 84" may be cylindrical and may be installed within an externally exposed cavity of the personal weapon 22 in a single-step operation, meaning that it can replace a standard component of the personal weapon 22 which is externally exposed and which has been removed, and that the process of installing the durable asset tag 84, 84', 84" in place of the standard component of the personal weapon 22 can be accomplished in a single step. The single step may be, for example, screwing, pounding, pressing, or otherwise installing the durable asset tag 84, 84', 84". The single step may be the same as the step of installing the component of the personal weapon 22 which the durable asset tag 84, 84', 84" replaces. The same tools and procedures may be used to install the durable asset tag as the component it replaces. Therefore, the assembly, manufacture, use, and maintenance of the personal weapon may be the same as it would be without the use of the durable asset tag. With the exception of the durable asset tag, the personal weapon may be entirely unmodified, from its factory condition and may maintain its specification, certification, and/or rating.

According to an aspect, and as shown in FIGS. 7-9 and 10A, the durable asset tag 84, 84', 84" may be a pin, screw, bolt, or other fastener for joining together two or more assembly-level components of the personal weapon 22. The durable asset tag 84, 84', 84" may be, for example, a buttstock slide lock pin 86, a takedown pin 88, a pistol grip screw 90, a pivot pin 92, a forward grip pin 94, or a front sight pin 96. By placing the RFID transponder 28 within a removable durable asset tag 84, 84', 84", the RFID transponder 28 may be protected from physical damage and from Chemical agents such as cleaning solvents. It also allows for the personal weapon 22 to be wirelessly identified without altering the military specification or the structural integrity of the personal weapon 22. These are merely illustrative examples, and the durable asset tag 84, 84', 84"

may take other forms which may depend on the type and model of personal weapon 22 into which it is to be installed.

As shown in FIG. 2, the tracking system 20 may include an RFID reader 98 capable of reading the Second Unique Identifier 30 from the RFID transponder 28 in the durable asset tag 84 via a first wireless data connection 100 which is an RF data connection. The RFID reader 98 may communicate the second unique identifier 30 to the AIM interface terminal 56 using a second wireless data connection 102, which may be, for example, a Bluetooth connection. The RFID reader 98 may include a first antenna 104 for communicating with the RFID transponder 28.

The first wireless data connection 100 between the RFID transponder 28 and the RFID reader 98 may require physical contact between the personal weapon 22 and the first antenna 104 of the RFID reader 98. Alternatively, the first wireless data connection 100 between the RFID transponder 28 and the RFID reader 98 may be capable of communicating over a distance separating the personal weapon 22 and the first antenna 104 of the RFID reader 98.

Figure 8:
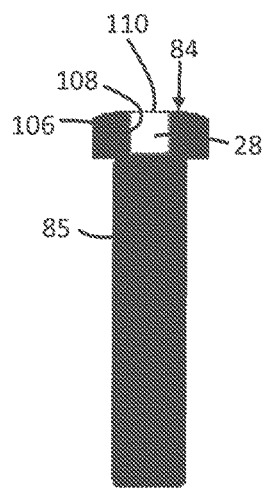
FIG. 8 is a cross-section of a durable asset tag according to an embodiment of the subject invention.

As shown in FIG. 8, the durable asset tag 84 may be made of metal (such as steel) and may include a body 85 having a head 106 a head as a wider portion at one end thereof, and which is exposed with the durable asset tag 84 installed in the personal weapon 22. The durable asset tag 84 may define a first cavity 108 which may be generally cylindrical for holding the RFID transponder 28 and which is exposed with the durable asset tag 84 installed in the personal weapon 22. The body 85 may be, for example, 1.157" long and 0.2708" in diameter, with a head 106 being 0.16" high and 0.4333" in diameter. The first cavity 108 may be, for example, 0.1875" in diameter and 0.1969" deep. The RFID transponder 28 may be secured in the first cavity 108 of the durable asset tag 84 by a first coating 110 of nonconductive material such as epoxy. The first cavity 108 of the durable asset tag 84 may be lined with a covering of non-conductive material, such as, for example, a nonconductive resin for shielding the RFID transponder 28 from electromagnetic interference from the metal body 85, 85', 85" of the durable asset tag.

Figure 9:
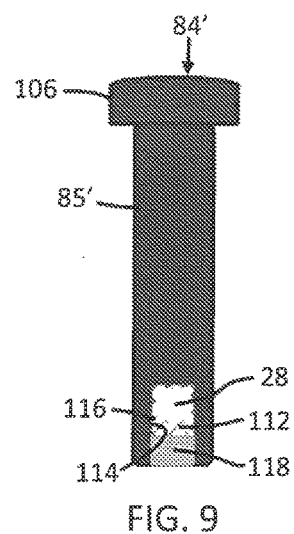
FIG. 9 is a cross-section of a durable asset tag according to another embodiment of the subject invention.
Figure 10A:
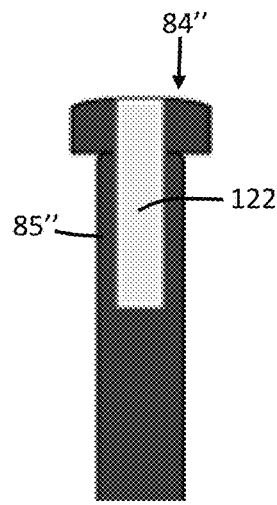
FIG. 10A is a cross-section of a durable asset tag according to still another embodiment of the subject invention.

As shown in FIG. 9, the durable asset tag 84' may instead define a second cavity 112 opposite the head 106 which may be generally cylindrical for holding the RFID transponder 28 and which may definite a first internal thread 114. The second cavity 112 may be, for example, 0.1875" in diameter and 0.1969" deep. The RFID transponder 28 may be disposed in the second cavity 112 of the durable asset tag 84' and secured therein by a second coating 116 of nonconductive material such as epoxy. A stopper 118 may enclose the second cavity 112 and cover the RFID transponder 28. The stopper 118 may include a first external thread 120 for engaging the first internal thread 114 of the second cavity 112.

Figure 11A:
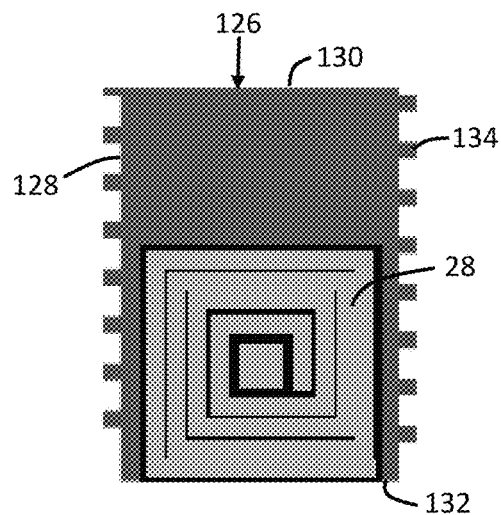
FIG. 11A is a cross-section of a plug for the durable asset tag of FIG. 10A.

The durable asset tag 84, 84', 84" may be etched as a wave guide to promote RF signal communications. As shown in FIGS. 10A-10B and 11A-11C, the durable asset tag 84" may define a third cavity 122, which may be generally cylindrical and which may have a second internal thread 124. The RFID transponder 28 may be disposed within a plug 126 fitting inside of the third cavity 122. The plug 126 may be made of electrically insulating material, such as plastic or fiberglass, for conducting RF transmissions to and from the RFID transponder 28. The plug 126 may be formed from a high tensile strength non-conducting rod such as FR4 fiberglass and may be 0.1875" in diameter. As shown in FIGS. 11A-11C, the plug 126 may be generally cylindrical, including a side wall 128 extending between a first end 130 and a second end 132 and defining a second external thread 134 for threadedly engaging the second internal thread 124 with the plug 126 disposed within the third cavity 122 of the durable asset tag 84". As shown in FIG. 11B, the first end 130 of the plug 126 may define a plurality of indentations 136 for receiving a tool for screwing the plug 126 into the durable asset tag 84". As shown in FIG. 11C, the second end 132 of the plug 126 may define a slot 138 extending into the plug 126 toward the first end 130 for receiving the RFID transponder 28. The slot 138 may have a depth of about 5 mm.

Figure 10B:
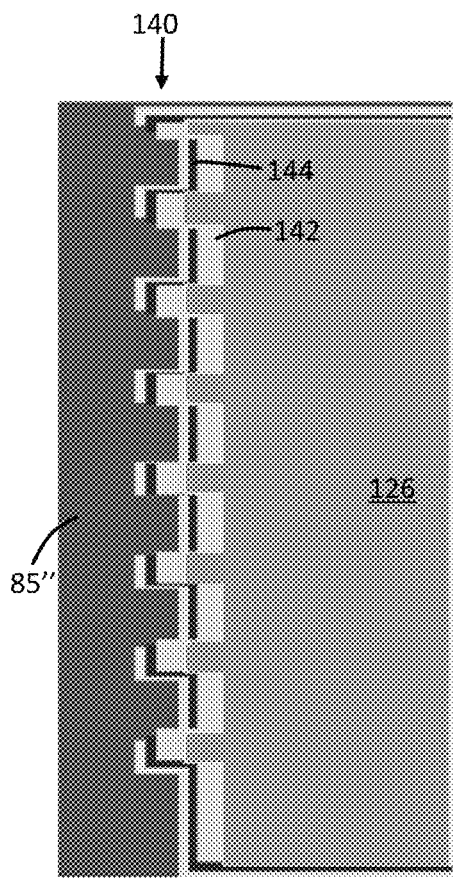
FIG. 10B is an enlarged cross-section of an the durable asset tag of FIG. 10A.
Figure 11B:
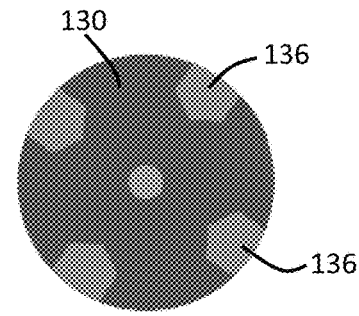
FIG. 11B is a top view of the plug of FIG. 11A.
Figure 11C:
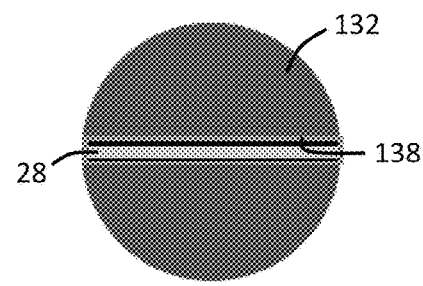
FIG. 11C is a bottom view of the plug of FIG. 11A.
Figure 12:
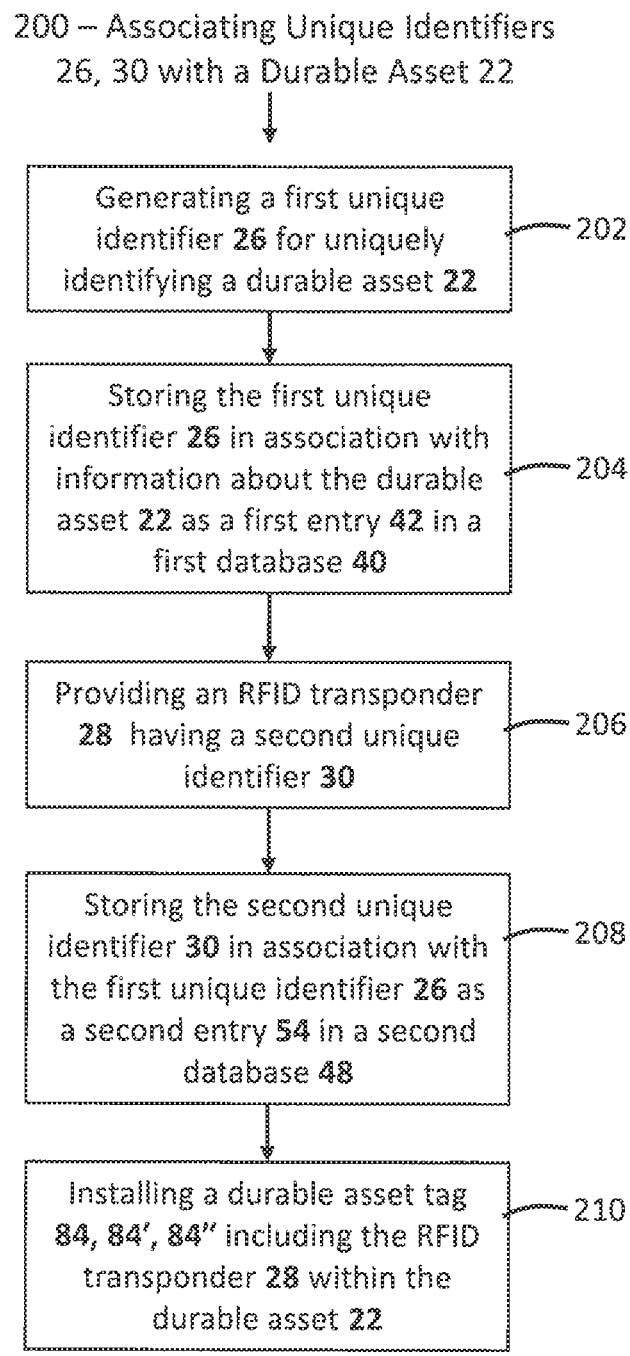
FIG. 12 is a flow chart of a method for associating unique identifiers with a durable asset according to an aspect of the subject invention.
Figure 13:
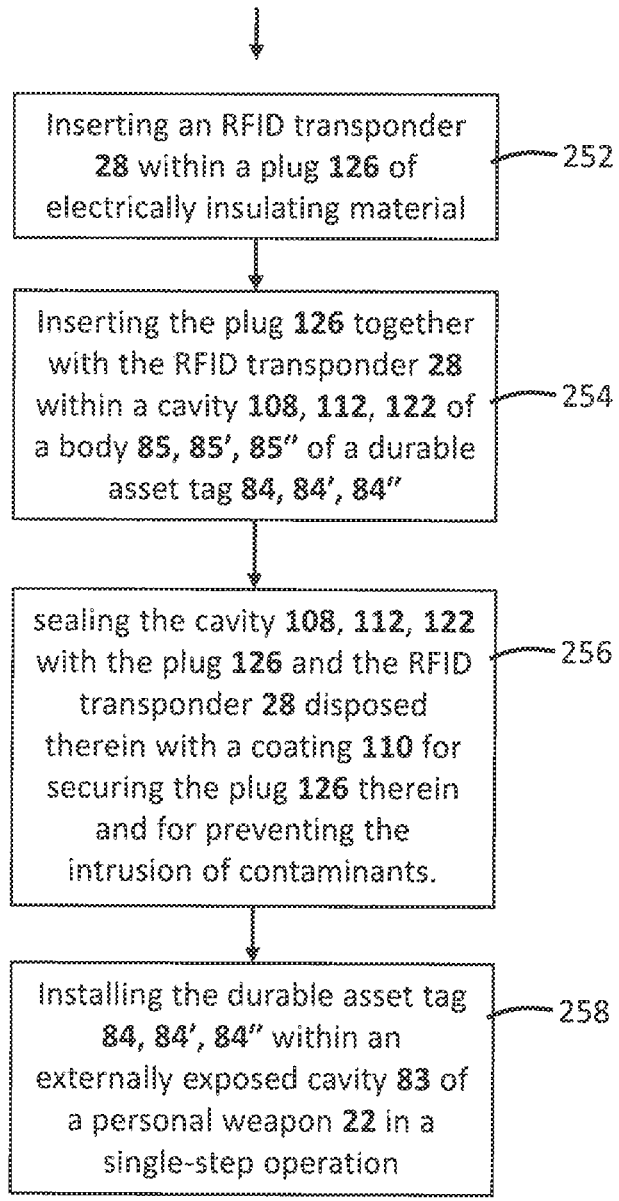
FIG. 13 is a flow chart of a method for tagging a durable asset according to an aspect of the subject invention.
Figure 14:
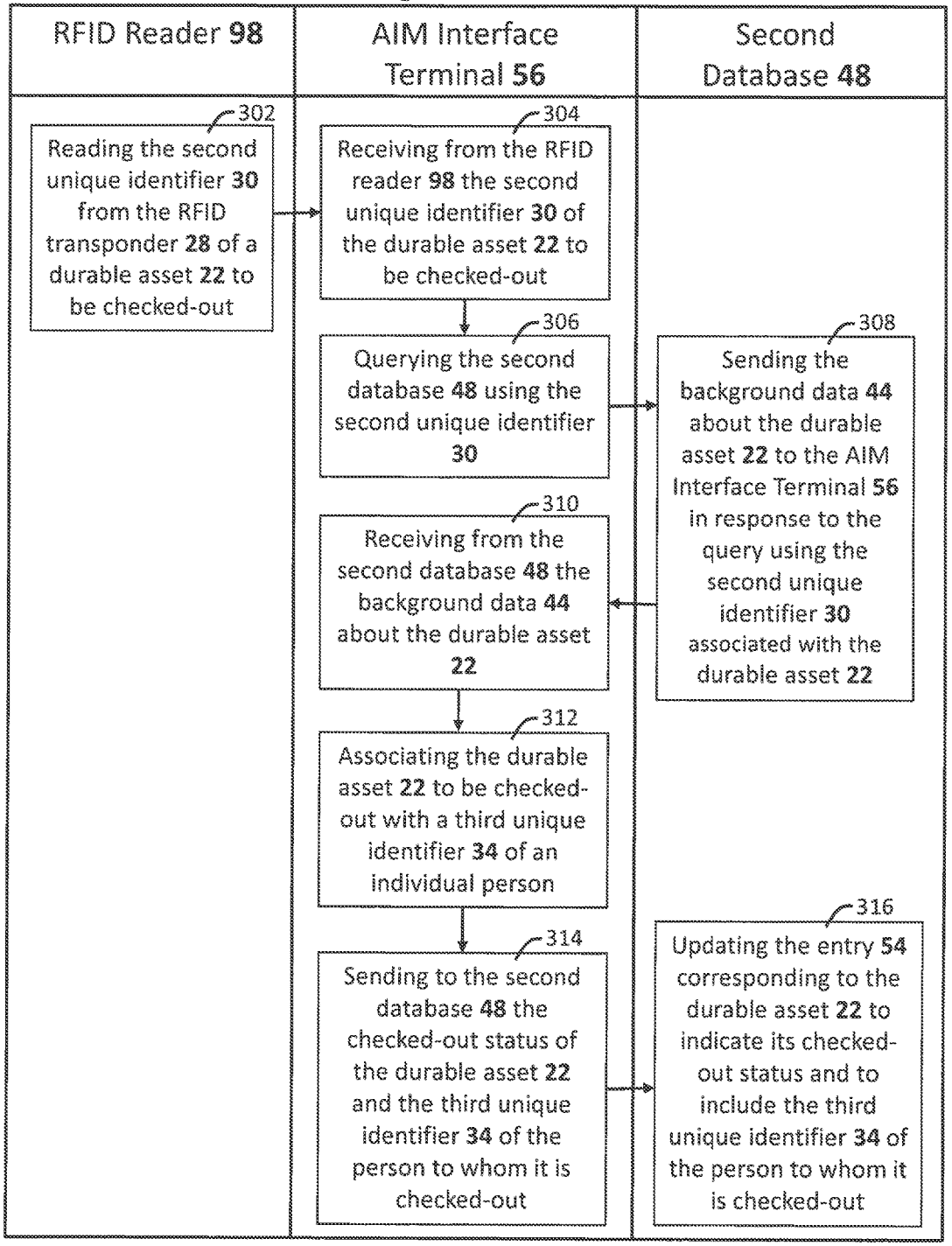
FIG. 14 is a block diagram of a method for checking-out a durable asset according to an aspect of the subject invention.
Figure 15:
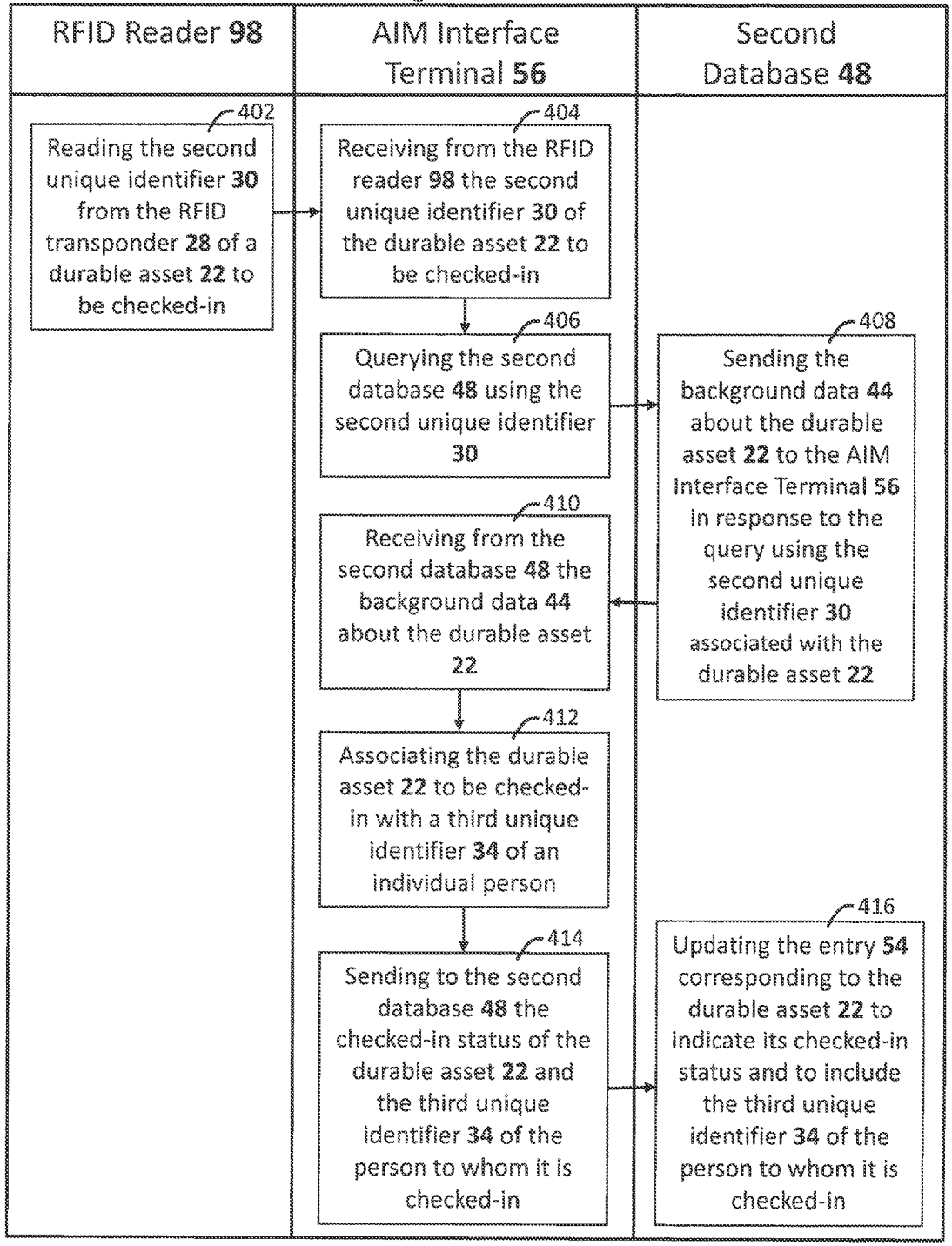
FIG. 15 is a block diagram of a method for checking-in a durable asset according to an aspect of the subject invention.

As best shown in FIG. 10B, the durable asset tag 84" may include a second antenna 140, which may be configured as a helical antenna, and which may include a first layer 142 of electrically conductive material, such as conductive adhesive, disposed about the side wall 128 of the plug 126 within the second external thread 134 and covered by a second layer 144 of electrical insulating material, such as resin. In this way, the first layer 142 of conductive material is sandwiched between electrically insulating materials and is isolated from direct contact with conductive structures, such as the metal body 85" of the durable asset tag 84". The first layer 142 may be in electrical communication with the RED transponder 28, and thereby functioning as the second antenna 140 for communicating with the first antenna 104.

In practice, the durable asset tag 84, 84', 84" may be configured to replace a specific component of a specific make and model of a personal weapon 22. A technician may first remove the existing component that the durable asset tag 84, 84', 84" is configured to replace. The technician may then, in a single-step operation, install durable asset tag 84, 84', 84" in the personal weapon 22. The single-step operation of installing the durable asset tag 84, 84', 84" may be, for example, screwing, pounding, pressing, or otherwise installing the durable asset tag 84, 84', 84" into an externally exposed cavity of the personal weapon 22. In this way, the technician may quickly and easily modify the personal weapon 22 to include the durable asset tag 84, 84', 84" without undertaking a complex disassembly process. Alternatively, the personal weapon may be manufactured with the durable asset tag 84, 84', 84" as an original component.

According to an aspect, the subject invention may include a method 200 for associating one or more unique identifiers 26, 30 with a durable asset 22, which may include a combination of one or more of the following steps: 202 generating a first unique identifier 26 for uniquely identifying a durable asset 22; 204 storing the first unique identifier 26 in association with information about the durable asset 22 as an entry 42 in a first database 40; 206 providing an RFID transponder 28 having a second unique identifier 30; 208 storing the second unique identifier 30 in association with the first unique identifier 26 as a second entry 54 in a second database 48; and 210 installing a durable asset tag 84, 84', 84" including the RFID transponder 28 within the durable asset 22.

According to an aspect, the subject invention may include a method 250 for tagging a durable asset 22, which may include a combination of one or more of the following steps: 252 inserting an RFID transponder 28 within a plug 126 of electrically insulating material; 254 inserting the plug 126 together with the RFID transponder 28 within a cavity 108, 112, 122 in a body 85, 85', 85" of a durable asset tag 84, 84', 84"; 256 sealing the cavity 108, 112, 122 with the plug 126 and the RFID transponder 28 disposed therein with a coating 110 for securing the plug 126 therein and for preventing the intrusion of contaminants; and 258 installing the durable asset tag 84, 84', 84" within an externally exposed cavity of the durable asset 22 in a single-step operation. The step of 258 installing the durable asset tag 84, 84', 84" may include, for example, replacing a standard component of the durable asset 22 which is externally exposed and which has been removed. The single-step operation of installing the durable asset tag 84, 84', 84" may include, for example, screwing, pounding, pressing, or otherwise installing the durable asset tag 84, 84', 84".

According to another aspect, the subject invention may include a method 300 for checking-out a durable asset 22 to an individual person, which may include a combination of one or more of the following steps: 302 reading by the RFID reader 98 the second unique identifier 30 from the RFID transponder 28 of a durable asset 22 to be checked-out; 304 receiving by the AIM interface terminal 56 from the MID reader 98 the second unique identifier 30 of the durable asset 22 to be checked-out; 306 querying by the AIM interface terminal 56 the second database 48 using the second unique identifier 30; 308 sending by the second database 48 the background data 44 about the durable asset 22 to the AIM interface terminal 56 in response to the query using the second unique identifier 30 associated with the durable asset 22; 310 receiving by the AIM interface terminal 56 from the second database 48 the background data 44 about the durable asset 22; 312 associating by the AIM interface terminal 56 the durable asset 22 to be checked-out with a third unique identifier 34 of an individual person; 314 sending by the AIM interface terminal 56 to the second database 48 the checked-out status of the durable asset 22 and the third unique identifier 34 of the person to whom it is checked-out; and 316 updating by the second database 48 the entry 54 corresponding to the durable asset 22 to indicate its checked-out status and to include the third unique identifier 34 of the person to whom it is checked-out.

According to another aspect, the subject invention may include a method 400 for checking-in a durable asset 22 from an individual person, which may include a combination of one or more of the following steps: 402 reading by the RFID Reader 98 the second unique identifier 30 from the RFID transponder 28 of a durable asset 22 to be checked-in; 404 receiving by the AIM interface terminal 56 from the RFID reader 98 the second unique identifier 30 of the durable asset 22 to be checked-in; 406 querying by the AIM interface terminal 56 the second database 48 using the second unique identifier 30; 408 sending by the second database 48 the background data 44 about the durable asset 22 to the AIM interface terminal 56 in response to the query using the second unique identifier 30 associated with the durable asset 22; 410 receiving by the AIM interface terminal 56 from the second database 48 the background data 44 about the durable asset 22; 412 Associating by the AIM interface terminal 56 the durable asset 22 to be checked-in with a third unique identifier 34 of an individual person; 414 sending by the AIM interface terminal 56 to the second database 48 the checked-in status of the durable asset 22 and the third unique identifier 34 of the person to whom it is checked-in; and 416 updating by the second database 48 the entry 54 corresponding to the durable asset 22 to indicate its checked-in status and to include the third unique identifier 34 of the person to whom it is checked-in.

The methods of 300 checking-out the durable asset 22 and 400 checking-in the durable asset 22 may be advantageously employed where the third unique identifier 34 of the individual person is machine, readable by or is automatically communicated to AIM interface terminal 56. Such machine reading may be a smart card interface 68 on the AIM interface terminal 56, such as the TSS-PK series iPad reader. The AIM interface terminal 56 may also automatically and/or electronically receive the third unique identifier 34 of the individual person by other means by other methods such as, for example, by electronic, optical, digital radio, or by reading or scanning an identification card 32 associated with the individual person to whom the durable asset 22 is to be checked-in or checked-out.

Obviously, many modifications and variations of the present invention are possible in light of the above teachings and may be practiced otherwise than as specifically described while being within the scope of the appended claims and their equivalents. Durable assets other than those described previously and which are commonly checked-in and checked-out for use by military, police, and other personnel may be used in connection with the present invention. Examples of such durable assets may include, for example, optics devices such as night vision goggles and weapons scopes, man-portable, and man-packable items, and larger items such as vehicles, trailers, and generators.

What is claimed is:

1. A durable asset tag provided as a structural component of a durable asset and comprising:
   a body made of metal defining a cavity;
   an RFID transponder having a unique identifier being machine readable by radio frequency;
   said RFID transponder being disposed within a plug of electrically insulating material; and
   said RFID transponder and said plug together disposed within said cavity of said body, wherein
   said durable asset tag includes a helical antenna including a first layer of electrically conductive adhesive disposed about a side wall of said plug within an external thread of said plug and covered by a second layer of electrically insulating resin; and
   said first layer is in electrical communication with said RFID transponder said second layer encases said first layer to prevent electrical contact with said body, thereby allowing said first layer to function as said helical antenna.

2. A durable asset tag as set forth in claim 1, wherein said body further includes a head as a wider portion at one end thereof, and wherein said head defines said cavity for holding said RFID transponder and said plug.

3. A durable asset tag as set forth in claim 1, wherein said cavity is generally cylindrical, and wherein said body defines an internal thread in said cavity.

4. A durable asset tag as set forth in claim 3, wherein said plug defines at least one indentation for receiving a tool for screwing said plug into said durable asset tag.

5. A method for tracking a durable asset comprising:
   generating a first unique identifier for uniquely identifying a durable asset;
   storing the first unique identifier in association with background data about the durable asset as a first entry in a database;
   providing an RFID transponder having a second unique identifier;
   storing the second unique identifier in association with the first unique identifier as a second entry in a database;
   installing a durable asset tag including the RFID transponder within the durable asset; and
   providing an AIM interface terminal capable of securely communicating with a database and capable of electronically receiving the second unique identifier from the RFID transponder, and capable of electronically reading a third unique identifier from an identification card associated with an individual person, and further including checking out the durable asset by the steps of:

reading by an RFID reader the second unique identifier from the RFID transponder of a durable asset to be checked out;

receiving by the AIM interface terminal from the RFID reader the second unique identifier of the durable asset to be checked out;

providing an identification card associated with an individual person and having a machine readable third unique identifier and receiving by the AIM interface terminal the third unique identifier from the identification card to whom the durable asset is to be checked out;

querying the database by the AIM interface terminal using the second unique identifier and receiving from the database the background data about the durable asset;

associating by the AIM interface terminal the durable asset to be checked out with the individual person to whom the durable asset is to be checked out; and sending by the AIM interface terminal to the database a signal indicating the checked-out status of the durable asset and including the third unique identifier from the identification card to whom the durable asset is checked out.

6. A method for tracking a durable asset as set forth in claim 5, wherein the durable asset includes an externally exposed cavity; and wherein the step of installing the durable asset tag including the RFID transponder within the durable asset further includes installing the durable asset tag within the externally exposed cavity of the durable asset in a single-step operation.

7. A method for tracking a durable asset as set forth in claim 5, wherein the durable asset comprises a personal weapon.

8. A method for tracking a durable asset as set forth in claim 5, wherein the background data about the durable asset includes a serial number.

9. A method for tracking a durable asset, comprising:

generating a first unique identifier for uniquely identifying a durable asset;

storing the first unique identifier in association with background data about the durable asset as a first entry in a database;

providing an RFID transponder having a second unique identifier;

storing the second unique identifier in association with the first unique identifier as a second entry in a database;

installing a durable asset tag including the RFID transponder within the durable asset; and providing an AIM interface terminal capable of securely communicating with a database and capable of electronically receiving the second unique identifier from the RFID transponder, and further including checking in the durable asset by the steps of:

reading by an RFID reader the second unique identifier from the RFID transponder of a durable asset to be checked in;

receiving by the AIM interface terminal from the RFID reader the second unique identifier of the durable asset to be checked in;

querying the database by the AIM interface terminal using the second unique identifier and receiving from the database the background data about the durable asset; and sending by the AIM interface terminal to the database a signal indicating the checked-in status of the durable asset.

10. A method for tracking a durable asset as set forth in claim 9, further including the steps of:

providing an identification card associated with an individual person and having a machine readable third unique identifier and receiving by the AIM interface terminal the third unique identifier from the identification card to whom the durable asset is to be checked-in; and associating by the AIM interface terminal the durable asset to be checked-in with the individual person from whom the durable asset is to be checked-in;

wherein the step of sending by the AIM interface terminal to the database a signal indicating the checked-in status of the durable asset further includes sending the third unique identifier from the identification card of the individual person from whom the durable asset is checked in.

* * * * *